No. 758,683. PATENTED MAY 3, 1904.
J. S. PECK.
SYSTEM OF ELECTRICAL DISTRIBUTION.
APPLICATION FILED AUG. 8, 1903.
NO MODEL. 2 SHEETS—SHEET 1.

WITNESSES:
C. L. Belcher
F. H. Miller

INVENTOR
John S. Peck
BY
Wesley G. Carr
ATTORNEY

No. 758,683. PATENTED MAY 3, 1904.
J. S. PECK.
SYSTEM OF ELECTRICAL DISTRIBUTION.
APPLICATION FILED AUG. 8, 1903.
NO MODEL. 2 SHEETS—SHEET 2.

WITNESSES:
C. L. Belcher
F. H. Miller

INVENTOR
John S. Peck
BY
Wesley S. Carr
ATTORNEY

No. 758,683.

Patented May 3, 1904.

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 758,683, dated May 3, 1904.

Application filed August 8, 1903. Serial No. 168,744. (No model.)

*To all whom it may concern:*

Be it known that I, JOHN S. PECK, a citizen of the United States, and a resident of Pittsburg, in the county of Allegheny and State of Pennsylvania, have invented a new and useful Improvement in Systems of Electrical Distribution, of which the following is a specification.

My invention relates to systems of electrical distribution, and particularly to such systems as involve the conversion of alternating currents into direct currents by means of rotary converters.

The object of my invention is to provide a method for so distributing the self-induction included in the alternating-current side of systems of electrical distribution employing rotary converters that equal differences of potential may be obtained between slip-rings belonging to the different phases.

Figure 1:
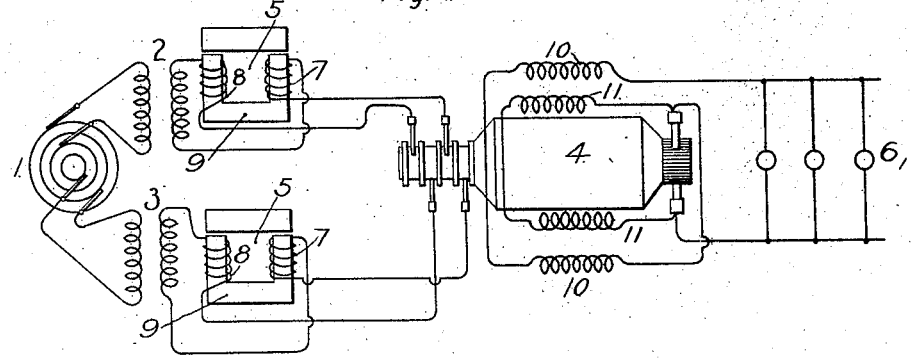
Figure 2:
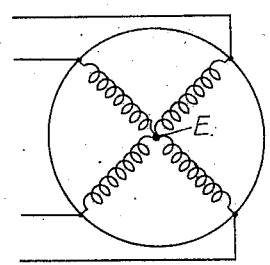
Figure 3:
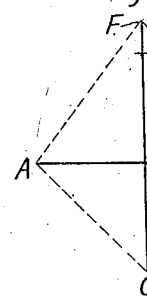
Figure 4:
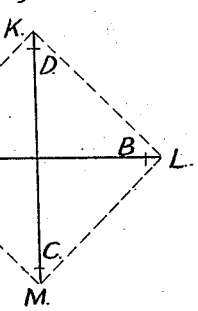
Figure 5:
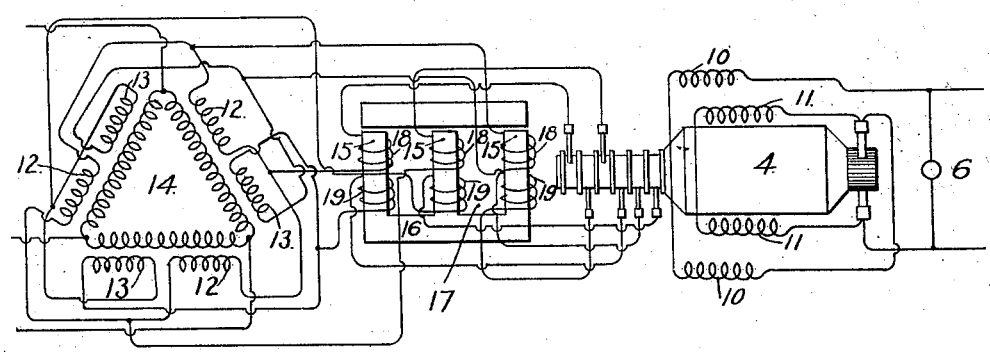
Figure 6:
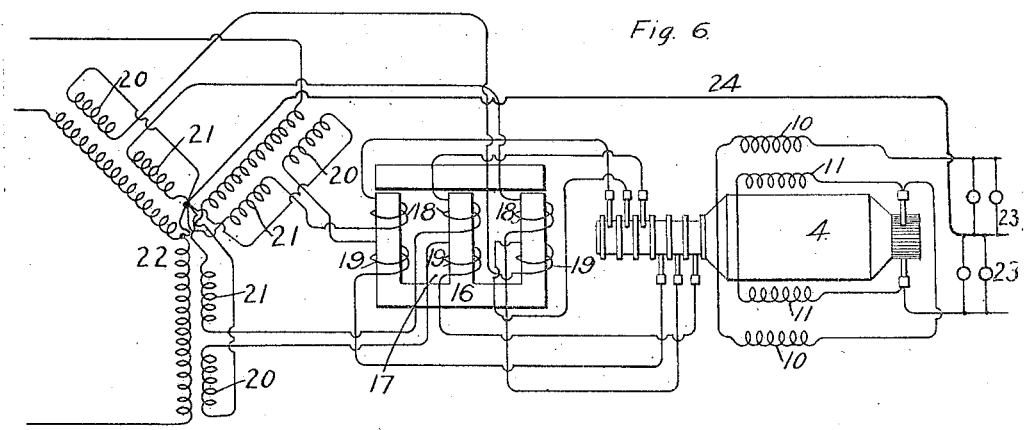
Figure 7:
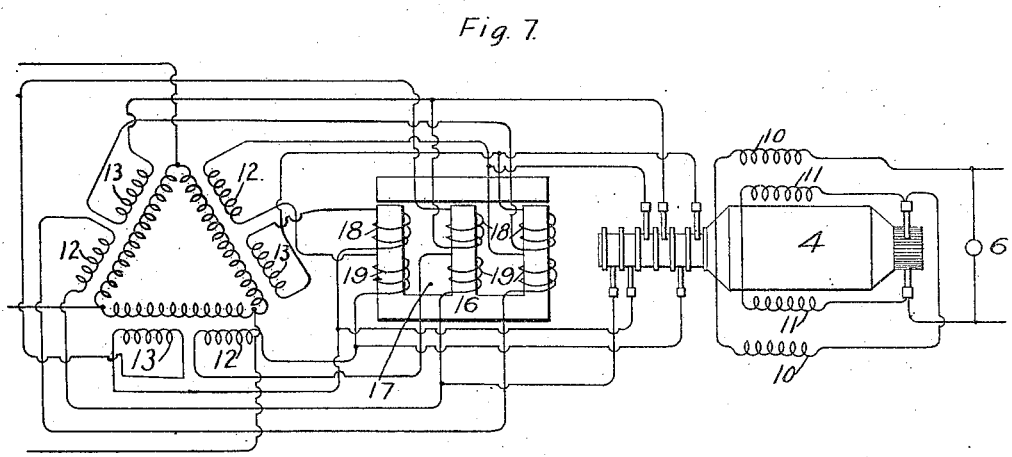

In the accompanying drawings, Figure 1 is a diagram of a two-phase system of distribution embodying my invention. Fig. 2 is a diagram of the armature-windings of a two-phase machine connected together at their middle points. Figs. 3 and 4 illustrate electromotive-force relations. Figs. 5 and 6 are diagrams of systems employing six-phase rotaries, the former being connected in double delta and the latter in double star; and Fig. 7 is a diagram showing the inductive resistances connected inside the double delta.

In the operation of rotary converters it is desirable to be able to vary, through a limited range, the voltage delivered to the direct-current mains. A well-known practice is to place suitable reactance or self-induction in the alternating circuit supplying the rotary converters, so that if the fields of the rotary converters are weakened lagging currents are set up, resulting in a lowering of the alternating-current electromotive force supplied to the converters and a consequent lowering of the direct-current electromotive force delivered by the converters. If the converter-fields are strengthened, a raising of the direct-current electromotive force results. In a three-phase circuit supplying a converter a reactance-coil would be employed in each of the three-phase mains. If the middle points of the two separate portions of the armature-winding of a two-phase rotary converter are not connected, it is only necessary to place self-induction in series with one conductor of each of the phases; but if the middle points of the two portions of the winding are connected this arrangement would result in the impressing of unequal voltages on the various parts of the said winding. For instance, in Fig. 3 the line A B represents in direction and magnitude one phase of the electromotive force impressed on the converter-armature winding and the line C D the other phase, the middle points of the winding being connected as indicated at E in Fig. 2. If reactance is included in only one conductor of each phase and the field of the converter is strengthened, there results a raising of the alternating-current voltage in only the two halves of the portion of the converter-armature winding which are connected directly to the conductors in which the self-induction is included. These added voltages are represented by lines D F and B G in Fig. 3, and it is evident that the resultant voltages between phases A F, F G, G C, and C A are unequal. The effect of the inequality of these voltages is to produce local currents in the rotary-converter armature-winding, causing undue heating. These difficulties I avoid by providing self-induction in series with both conductors of the two phases, the effect being to add equal small voltages to both portions of the voltage impressed on each phase of the armature-winding or to subtract the same, as the case may be.

By referring to Fig. 4 it may be seen that the equal voltages represented by lines A H and B L and D K and C M are respectively added to each of the voltages represented by lines A B and C D and that the resultant voltages between phases H K, K L, L M, and M H are equal. Only two reactance-coils, one per phase, are required if they are made in halves, so that one-half may be connected in series with each conductor of a phase.

In Fig. 1 the two-phase generator 1 is represented as supplying energy to the primary windings of two transformers 2 and 3, the secondary windings of which supply energy to a rotary converter 4. Reactance devices 5 are included in the alternating-current side of the system between the transformers 2 and 3 and the rotary converter 4 for the purpose of regulating the direct-current voltage supplied to the translating devices 6, as hereinbefore set forth. The construction of said reactance-coils is evidently simplified by providing the two coils 7 and 8, pertaining to the respective phases, with a single magnetic circuit 9; but a different arrangement may be employed, if desired. The series field-magnet winding 10 of the rotary converter is connected so as to assist the effect of the shunt-winding 11, as is usual when inductive resistance is utilized in connection with rotary converters for regulating the direct-current electromotive force.

My invention may also be adapted for use with six-phase rotary converters, as shown in Figs. 5 and 6. As illustrated in Fig. 5, the two portions 12 and 13 of the secondaries of the three-phase transformer 14 are connected in a double-delta arrangement in order to obtain six-phase currents for the rotary converter 4, the transformer being supplied with energy from any suitable three-phase source. (Not shown.) The legs 15 of the iron core 16 of a three-phase reactance device 17 are severally provided with two coils 18 and 19, which are respectively connected in circuit between the secondary coils 12 and 13 and the rotary converter. Three single-phase reactance devices may be employed instead of a single device, if desired, provided each device has two coils and the several coils are so connected in circuit as to provide the desired inductive resistance for each phase.

In Fig. 6 I have shown the secondaries 20 and 21 of a three-phase transformer 22 connected in double star, and I have also shown two sets of translating devices 23 supplied by a three-wire circuit the neutral conductor 24 of which is connected to the neutral point of the secondary windings of the transformer 22. In all other respects the combination is the same as that shown in Fig. 5. The combination shown in Fig. 1 might also be provided with a neutral conductor for three-wire distribution in the manner set forth in Patent No. 607,621, granted July 19, 1898, to the Westinghouse Electric and Manufacturing Company as assignee of B. G. Lamme. In either case my present invention serves to maintain stability both as regards the electromotive forces of the different phases and as regards the neutral point of the system.

In Fig. 7 I have shown a combination that is exactly like that shown in Fig. 5, except that the coils 18 and 19 of the reactance device 17 are included in the double-delta circuits of the transformer-windings 12 and 13 instead of being merely connected thereto, as in the arrangement shown in Fig. 5.

I claim as my invention—

1. In a system of electrical distribution, conductors for transmitting energy of an even number of phases, reactance or inductive-resistance coils in series with each of said conductors, the reactance-coils in series with conductors belonging to each phase being placed in the same magnetic circuit, a rotary converter having the middle points of the various portions of its armature-winding connected together and having shunt and series field-magnet windings, and direct-current mains which supply suitable translating devices and which are connected to the commutator of the said rotary converter in the usual manner.

2. In a system of electrical distribution, conductors for transmitting energy of an even number of phases, reactance or inductive-resistance coils in series with each of said conductors, a rotary converter having the middle points of the various portions of its armature-winding connected together and having shunt and series field-magnet windings, and direct-current mains which supply suitable translating devices and which are connected to the commutator of the said rotary converter in the usual manner.

3. In a system of electrical distribution, conductors for transmitting energy of an even number of phases, reactance or inductive-resistance coils in series with each of said conductors, the reactance-coils in series with the conductors belonging to each phase being placed in the same magnetic circuit, a rotary converter having shunt and series field-magnet windings, and direct-current mains which supply suitable translating devices and which are connected to the commutator of the said rotary converter in the usual manner.

4. In a system of electrical distribution, conductors for transmitting energy of an even number of phases, reactance or inductive-resistance coils in series with each of said conductors, a rotary converter having shunt and series field-magnet windings, and direct-current mains which supply suitable translating devices and which are connected to the commutator of the said rotary converter in the usual manner.

5. In a system of electrical distribution, conductors for transmitting energy of an even number of phases, reactance or inductive-resistance coils in series with each of said conductors, the reactance-coils in series with the conductors of opposite phases being placed on the same portion of the magnetic circuit, a rotary converter having shunt and series field-magnet windings connected and arranged in opposition and direct-current mains which supply suitable translating devices and which are connected to the commutator of the said rotary converter in the usual manner.

6. In a system of electrical distribution, transformers the secondaries of which are connected in a double-delta arrangement, conductors for transmitting energy of an even number of phases, reactance or inductive-resistance coils in series with each of said conductors, the reactance-coils in series with the conductors of opposite phases being placed on the same portion of the magnetic circuit, a rotary converter having shunt and series field-magnet windings, and direct-current mains which supply suitable translating devices and which are connected to the commutator of the said rotary converter in the usual manner.

7. In a system of electrical distribution, transformers the secondaries of which are connected in double-delta arrangement, conductors for transmitting energy of an even number of phases, reactance or inductive-resistance coils in series with each of said conductors, the reactance-coils in series with the conductors of opposite phases being placed on the same portion of the magnetic circuit, a rotary converter having shunt and series field-magnet windings and direct-current mains which supply suitable translating devices and which are connected to the commutator of the said rotary converter in the usual manner.

8. In a system of electrical distribution, transformers the secondaries of which are connected in a double-delta arrangement and include inductive resistances within the delta, the inductive-resistance coils in series with conductors of opposite phases being placed on the same portion of the magnetic circuit, conductors for transmitting energy of an even number of phases, a rotary converter having shunt and series field-magnet windings and direct-current mains which supply suitable translating devices and which are connected to the commutator of the said rotary converter in the usual manner.

In testimony whereof I have hereunto subscribed my name this 4th day of August, 1903.

JOHN S. PECK.

Witnesses:
　HONORIA L. DOUGHERTY,
　BIRNEY HINES.